United States Patent
Ueno et al.

(10) Patent No.: US 6,763,907 B2
(45) Date of Patent: Jul. 20, 2004

(54) VEHICLE STEERING APPARATUS

(75) Inventors: Masayuki Ueno, Kashiwara (JP); Katsutoshi Nishizaki, Nabari (JP); Ryouhei Hayama, Nabari (JP); Naotake Kanda, Nara (JP); Shirou Nakano, Minamikawachi-gun (JP); Takeo Iino, Kashiwara (JP); Tomoyasu Kada, Kaizuka (JP); Kenji Higashi, Yamatokooriyama (JP); Shingo Maeda, Kashiwara (JP); Shuuji Kimura, Kashihara (JP); Masaya Segawa, Yamatokooriyama (JP); Masayasu Higashi, Tondabayashi (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/413,174

(22) Filed: Apr. 14, 2003

(65) Prior Publication Data
US 2003/0201136 A1 Oct. 30, 2003

(30) Foreign Application Priority Data
Apr. 24, 2002 (JP) ........................................ 2002-122438

(51) Int. Cl.$^7$ .............................................. B62D 5/04
(52) U.S. Cl. ...................................... 180/444; 180/446
(58) Field of Search .............................. 180/444, 446, 180/443, 447; 475/3, 4, 7

(56) References Cited

U.S. PATENT DOCUMENTS

| | | | | |
|---|---|---|---|---|
| 4,658,927 A | * | 4/1987 | Kanazawa | ................... 180/422 |
| 5,174,407 A | * | 12/1992 | Shimizu et al. | ............. 180/444 |
| 5,284,219 A | * | 2/1994 | Shimizu et al. | ............. 180/444 |
| 5,511,629 A | | 4/1996 | Vogel | |
| 6,164,150 A | * | 12/2000 | Shindo et al. | .......... 74/388 PS |
| 6,199,654 B1 | * | 3/2001 | Kojo et al. | .................. 180/443 |
| 6,302,441 B1 | * | 10/2001 | Kawamuro et al. | ......... 280/771 |
| 6,382,344 B1 | * | 5/2002 | Lohner et al. | .............. 180/444 |
| 6,556,909 B2 | * | 4/2003 | Matsumoto et al. | .......... 701/41 |
| 2002/0029922 A1 | * | 3/2002 | Richardson et al. | ........ 180/444 |

FOREIGN PATENT DOCUMENTS

JP      2001-171543      6/2001

* cited by examiner

*Primary Examiner*—Lesley D. Morris
*Assistant Examiner*—Tony Winner
(74) *Attorney, Agent, or Firm*—Jordan and Hamburg LLP

(57) ABSTRACT

In a vehicle steering apparatus, a steering actuator is controlled so that the steering angle varies in accordance with the operation of an operating member. A transmission mechanism connects an operating side rotating member that is mechanically connected to the operating member and a vehicle wheel side rotating member that is mechanically connected to the vehicle wheels so that the mutual transmission of rotation is possible. Furthermore, the rotational transmission ratio between the operating side rotating member and the vehicle wheel side rotating member can be varied.

18 Claims, 8 Drawing Sheets

VEHICLE STEERING APPARATUS

FIELD OF THE INVENTION

The present invention relates to a vehicle steering apparatus in which the steering characteristics of the vehicle can be altered by the control of an actuator.

DESCRIPTION OF THE RELATED ART

There are vehicle steering apparatuses in which the steering characteristics can be altered by the control of a steering actuator. Such steering apparatuses include an apparatus with a so-called steer-by-wire system in which an operating member is not mechanically connected to the wheels of the vehicle, and an apparatus in which an operating member is mechanically connected to the wheels of the vehicle.

In the steering apparatus that employ the steer-by-wire system, without mechanically connecting the operating member having a shape of a steering wheel to the wheels of the vehicle, the steering characteristics are altered by transmitting the movement of the steering actuator to the wheels of the vehicle so that a variation in the steering angle is generated. In the steering apparatus in which the operating member is mechanically connected to the wheels of the vehicle, the rotation of an input shaft corresponding to the operation of the steering wheel is transmitted to an output shaft via a variable transmission ratio mechanism such as a planetary gear mechanism or the like, the rotation of this output shaft is transmitted to the wheels of the vehicle so that a variation in the steering angle is generated, and the steering characteristics are altered by driving the ring gears or the like in the planetary gear mechanism by the steering actuator.

In the steering apparatus that employ the steer-by-wire system, a fail-safe function which is used to steer the wheels of the vehicle in the case of trouble with the actuator or control system is required. Conventionally, a system has been proposed in which a fail-safe function is realized by using a clutch or the like to connect an operating side rotating member that is mechanically connected to the operating member with a vehicle wheel side rotating member that is mechanically connected to the wheels of the vehicle in the case of such trouble in the actuator or control system. However, since the abovementioned operating side rotating member and vehicle wheel side rotating member are not mechanically connected to each other on normal circumstances, the reliability of this function as a fail-safe function is insufficient.

In the steering apparatus in which the operating member is mechanically connected to the wheels of the vehicle via a variable transmission ratio mechanism, the movement of the wheels of the vehicle and the movement of the operating member interfere with each other when control for the purpose of compensating for fluctuations in the steering angle caused by irregularities in the road surface or the like is performed. Accordingly, a smooth operating feeling that is unaffected by irregularities in the road surface or the like, and operation of the operating member without any resistance, are impossible.

It is an object of the present invention to provide a vehicle steering apparatus that can solve the abovementioned problems.

SUMMARY OF THE INVENTION

The vehicle steering apparatus of the present invention comprises an operating member, a steering actuator, a steering gear which transmits the movement of the steering actuator to the vehicle wheels so that a variation in the steering angle is generated, a control system which is capable of controlling the steering actuator so that the steering angle varies in accordance with the operation of the operating member, an operating side rotating member which is mechanically connected to the operating member so as to rotate in accordance with the operation of this operating member, a vehicle wheel side rotating member which is mechanically connected to the vehicle wheels so as to rotate in accordance with the variation in the steering angle, and a transmission mechanism which mechanically connects the operating side rotating member and the vehicle wheel side rotating member to each other so that the transmission of rotation is possible, and so that the ratio of the rotational transmission can be varied.

In the present invention, since the operating side rotating member that is mechanically connected to the operating member and the vehicle wheel side rotating member that is mechanically connected to the vehicle wheels are capable of the mutual transmission of rotation via the transmission mechanism, the reliability of the fail-safe function can be improved.

It is desirable that the vehicle steering apparatus of the present invention comprise an adjustment actuator that is used to adjust the ratio of rotational transmission by the transmission mechanism, and a control system which is capable of controlling this adjustment actuator so that the ratio of rotational transmission by the transmission mechanism can be varied.

By using such control of the adjustment actuator to vary the ratio of rotational transmission between the vehicle wheel side rotating member and the operating side rotating member, it is possible to cause rotation of the operating side rotating member without this rotation being affected by the rotation of the vehicle wheel side rotating member. As a result, an arbitrary operating torque can be caused to act on the operating member without being affected by variations in the steering angle, so that steering operation can be smoothly accomplished without any mutual interference between the movement of the wheels of the vehicle and the movement of the operating member. For example, the vehicle steering apparatus of the present invention can comprise means for determining the amount of operation of the operating member, means for storing in memory a set relationship between the amount of operation of the operating member and the target steering angle, means for calculating the target steering angle from the determined amount of operation of the operating member and the stored relationship, means for determining the actual steering angle, means for storing in memory a set relationship between the amount of operation of the operating member and the target operating torque, means for calculating the target operating torque from the determined amount of operation of the operating member and the stored relationship, and means for determining the actual operating torque of the operating member. Furthermore, the abovementioned steering actuator is made controllable so that the deviation between the target steering angle and actual steering angle is reduced, and the abovementioned adjustment actuator is made controllable so that the deviation between the target operating torque and the actual operating torque is reduced. Furthermore, the adjustment actuator can be made controllable so that a torque oriented in an arbitrary direction acts on the operating member. The operating torque that acts on the operating member when the steering angle is varied can be reduced to zero by making the abovementioned adjustment actuator controllable so that the rotational force acting on the operating side rotating member is reduced to zero. Moreover, in cases where a fail-safe system in which the operating member and the vehicle wheels are connected via the abovementioned operating side rotating member and vehicle wheel side rotating member is caused to function when an abnormality in the steering actuator is detected, the torque that is caused to act on the operating member by the adjustment actuator can be controlled.

It is desirable that the vehicle steering apparatus of the present invention comprise abnormality detection means for detecting an abnormality in the adjustment actuator, and a restraining mechanism that is capable of restraining the variation in the ratio of the rotational transmission between the operating side rotating member and the vehicle wheel side rotating member, and that the variation in the ratio of the rotational transmission between the operating side rotating member and the vehicle wheel side rotating member is restrained by the restraining mechanism, the driving of the adjustment actuator is stopped, and the steering actuator is controlled so that a steering assist torque is caused to act, in cases where the abnormality is detected in the adjustment actuator.

As a result, the steering apparatus can function as a power steering apparatus in cases where an abnormality is detected in the adjustment actuator.

It is desirable that the vehicle steering apparatus of the present invention comprise abnormality detection means for detecting an abnormality in the adjustment actuator, and a restraining mechanism that is capable of restraining the variation in the ratio of the rotational transmission between the operating side rotating member and the vehicle wheel side rotating member, and that the variation in the ratio of the rotational transmission between the operating side rotating member and the vehicle wheel side rotating member is restrained by the restraining mechanism, and the driving of the adjustment actuator and steering actuator is stopped, in cases where the abnormality is detected in the adjustment actuator.

As a result, the steering apparatus can function as a manual type steering apparatus in cases where an abnormality is detected in the adjustment actuator.

It is desirable that the vehicle steering apparatus of the present invention comprise abnormality detection means for detecting an abnormality in the adjustment actuator, and that the driving of the adjustment actuator is stopped, and the transmission of rotation between the operating side rotating member and the vehicle wheel side rotating member is stopped, in cases where the abnormality is detected in the adjustment actuator.

As a result, even if an abnormality occurs in the adjustment actuator, the steering angle can be varied by controlling the steering actuator in accordance with the operation of the operating member, and there is no interference with the operation of the operating member.

It is desirable that the vehicle steering apparatus of the present invention comprise abnormality detection means for detecting an abnormality in the adjustment actuator, a restraining mechanism that is capable of restraining the variation in the ratio of the rotational transmission between the operating side rotating member and the vehicle wheel side rotating member, and a change-over switch for the abnormality handling modes that is used in cases where the abnormality is detected in the adjustment actuator, and that the switching of the abovementioned switch enables selection of one of three modes, i.e., a mode in which the variation in the ratio of the rotational transmission between the operating side rotating member and the vehicle wheel side rotating member is restrained by the restraining mechanism, the driving of the adjustment actuator is stopped, and the steering actuator is controlled so that a steering assist torque is caused to act, a mode in which the variation in the ratio of the rotational transmission between the operating side rotating member and the vehicle wheel side rotating member is restrained by the restraining mechanism, and the driving of the adjustment actuator and the steering actuator is stopped, and a mode in which the driving of the adjustment actuator is stopped, and the transmission of rotation between the operating side rotating member and vehicle wheel side rotating member is stopped.

As a result, in cases where an abnormality is detected in the adjustment actuator, either a mode in which the steering apparatus is caused to function as a power steering apparatus, a mode in which the steering apparatus is caused to function as a manual type steering apparatus, or a mode in which the steering actuator is controlled in accordance with the operation of the operating member, can be selected.

It is desirable that the vehicle steering apparatus of the present invention comprise abnormality detection means for detecting an abnormality in the steering actuator, and a restraining mechanism that is capable of restraining the variation in the ratio of the rotational transmission between the operating side rotating member and the vehicle wheel side rotating member, and that the variation in the ratio of the rotational transmission between the operating side rotating member and the vehicle wheel side rotating member is restrained by the restraining mechanism, the driving of the steering actuator is stopped, and the adjustment actuator is controlled so that a steering assist torque is caused to act, in cases where the abnormality is detected in the steering actuator.

As a result, the steering apparatus can be caused to function as a power steering apparatus by the adjustment actuator in cases where an abnormality is detected in the steering actuator.

It is desirable that the vehicle steering apparatus of the present invention comprise abnormality detection means for detecting an abnormality in the steering actuator, and a restraining mechanism that is capable of restraining the variation in the ratio of the rotational transmission between the operating side rotating member and the vehicle wheel side rotating member, and that the variation in the ratio of the rotational transmission between the operating side rotating member and the vehicle wheel side rotating member is restrained by the restraining mechanism, and the driving of the adjustment actuator and the steering actuator is stopped, in cases where the abnormality is detected in the steering actuator.

As a result, the steering apparatus can function as a manual type steering apparatus in cases where an abnormality is detected in the steering actuator.

It is desirable that the vehicle steering apparatus of the present invention comprise abnormality detection means for detecting an abnormality in the steering actuator, and means for detecting a variable that expresses the operating state of the vehicle, and that the driving of the steering actuator is stopped, and the adjustment actuator is controlled so that the ratio of the rotational transmission between the operating side rotating member and the vehicle wheel side rotating member is varied in accordance with the detected variable that expresses the operating state of the vehicle, in cases where the abnormality is detected in the steering actuator.

As a result, even if an abnormality occurs in the steering actuator, the steering apparatus can function as a steering apparatus that is capable of altering the steering characteristics in accordance with the operating state of the vehicle.

It is desirable that the vehicle steering apparatus of the present invention comprise abnormality detection means for detecting an abnormality in the steering actuator, a restraining mechanism that is capable of restraining the variation in the ratio of the rotational transmission between the operating side rotating member and the vehicle wheel side rotating member, means for detecting a variable that expresses the operating state of the vehicle, and a change-over switch for the abnormality handling modes that is used in cases where the abnormality is detected in the steering actuator, and that the switching of the abovementioned switch enables selection of one of three modes, i.e., a mode in which the variation in the ratio of the rotational transmission between the operating side rotating member and the vehicle wheel side rotating member is restrained by the restraining mechanism, the driving of the steering actuator is stopped, and the adjustment actuator is controlled so that a steering assist torque is caused to act, a mode in which the variation in the ratio of the rotational transmission between the operating side rotating member and the vehicle wheel side rotating member is restrained by the restraining mechanism, and the driving of the adjustment actuator and the steering actuator is stopped, and a mode in which the driving of the steering actuator is stopped, and the adjustment actuator is controlled so that the ratio of the rotational transmission between the operating side rotating member and the vehicle wheel side rotating member is varied in accordance with the abovementioned variable that expresses the operating state of the vehicle.

As a result, either a mode in which the steering apparatus can be caused to function as a power steering apparatus, a mode in which the steering apparatus can be caused to function as a manual type steering apparatus, or a mode in which the steering characteristics can be altered in accordance with the operating state of the vehicle, can be selected in cases where an abnormality is detected in the steering actuator.

It is desirable that the vehicle steering apparatus of the present invention comprise abnormality detection means for detecting an abnormality in the adjustment actuator, abnormality detection means for detecting an abnormality in the steering actuator, and a restraining mechanism that is capable of restraining the variation in the ratio of the rotational transmission between the operating side rotating member and the vehicle wheel side rotating member, and that the variation in the ratio of the rotational transmission between the operating side rotating member and the vehicle wheel side rotating member is restrained by the restraining mechanism, and the driving of the adjustment actuator and the steering actuator is stopped, in cases where the abnormality in the adjustment actuator and the abnormality in the steering actuator are detected.

As a result, the steering apparatus can function as a manual type steering apparatus in cases where abnormalities are detected in the adjustment actuator and steering actuator.

It is desirable that the vehicle steering apparatus of the present invention comprise abnormality detection means for detecting an abnormality in the control system of the steering actuator and the adjustment actuator, and a restraining mechanism that is capable of restraining the variation in the ratio of the rotational transmission between the operating side rotating member and the vehicle wheel side rotating member, and that the variation in the ratio of the rotational transmission between the operating side rotating member and the vehicle wheel side rotating member is restrained by the restraining mechanism, and the driving of the adjustment actuator and the steering actuator be stopped, in cases where the abnormality is detected in the control system.

As a result, even if an abnormality occurs in the control system, the steering apparatus can function as a manual type steering apparatus.

It is desirable that the abovementioned transmission mechanism have three elements that are capable of relative rotation, that the ratio of the rotational transmission between two of the elements can be varied in accordance with the variation in the rotational speed of the third element, that one of the three elements is connected to the operating side rotating member, that one of the elements that is not connected to the operating side rotating member is connected to the vehicle wheel side rotating member, that the remaining element is driven by the adjustment actuator, and that the ratio of the rotational transmission is varied by controlling the adjustment actuator by means of the control system. In this case, the abovementioned transmission mechanism has a planetary gear mechanism in which a planetary gear that engages with a sun gear and a ring gear is held by a carrier, and this sung gear, ring gear and carrier can be taken as the abovementioned three elements that are capable of relative rotation. As a result, the transmission mechanism can easily be structured from a known rotational transmission mechanism.

It is desirable that the transmission of rotation between the operating side rotating member and the vehicle wheel side rotating member via the transmission mechanism can be stopped in a state in which a mechanical connection between the operating side rotating member and the vehicle wheel side rotating member is maintained by the transmission mechanism.

As a result, the operating torque can be reduced to zero when there is a variation in the steering angle without any need for the adjustment actuator or control system.

According to the present invention, a fail-safe function can be securely obtained by means of a simple structure, and without any need for lowering the steering feeling experienced by the driver, in a vehicle steering apparatus in which the steering angle is varies by the control of an actuator.

DESCRIPTION OF THE PREFERRED EMBODIMENTS

Figure 1:
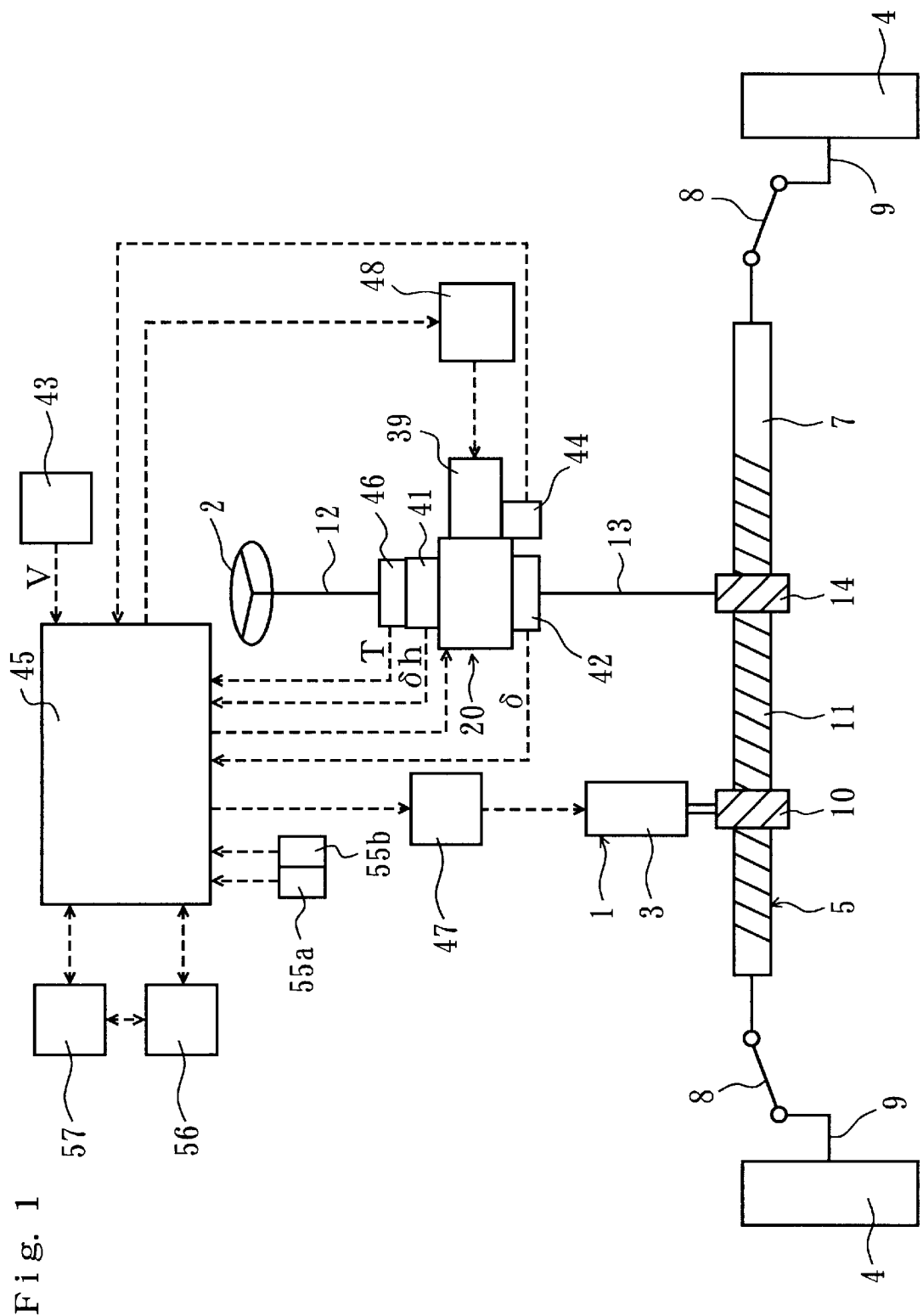
FIG. 1 is a structural explanatory diagram of a vehicle steering apparatus in an embodiment of the present invention.

The vehicle steering apparatus 1 shown in FIG. 1 comprises an operating member 2 in the shape of a steering wheel, a steering actuator 3, and a steering gear 5 which transmits the movement of the steering actuator 3 to the left and right vehicle wheels 4 so that a variation in the steering angle is generated. A known electric motor such as a brushless motor or a hydraulic motor can be adopted as the steering actuator 3. The steering gear 5 has a motion converting mechanism that converts the rotational motion of the output shaft of the steering actuator 3 into the linear motion of a steering rod 7. The movement of the steering rod 7 is transmitted to the vehicle wheels 4 via tie rods 8 and knuckle arms 9, so that the toe angle of the vehicle wheels 4 varies. In the present embodiment, this motion converting mechanism is structured from a pinion 10 that is attached to the output shaft of the steering actuator 3, and a rack 11 that engages with this pinion 10. The rack 11 is formed on the steering rod 7. There are no particular limitations on the structure of the steering gear 5 as long as the movement of the steering actuator 3 can be transmitted to the vehicle wheels 4 so that the steering angle varies. The wheel alignment of the vehicle wheels 4 is set so that a self-aligning torque is generated.

An operating side rotating member 12 in the shape of a shaft is mechanically connected to the operating member 2 so that this operating side rotating member 12 rotates in accordance with the operation of the operating member 2. The operating side rotating member 12 of the present embodiment is attached so that this member rotates together with the operating member 2. It is sufficient if the operating side rotating member 12 is mechanically connected to the operating member 2 so that this operating side rotating member 12 rotates in accordance with the operation of the operating member 2; for example, the members can be connected via a speed-change gear mechanism.

A vehicle wheel side rotating member 13 is mechanically connected to the vehicle wheels 4 so that this vehicle wheel side rotating member 13 rotates in accordance with the variation in the steering angle. The vehicle wheel side rotating member 13 of the present embodiment is connected so that this vehicle wheel side rotating member 13 rotates together with a pinion 14 that engages with the abovementioned rack 11. It is sufficient if the vehicle wheel side rotating member 13 is mechanically connected to the vehicle wheels 14 so that this vehicle wheel side rotating member 13 rotates in accordance with the variation in the steering angle; the connection with the vehicle wheels 14 is not limited to a connection using a rack 11 and pinion 14.

Figure 2:
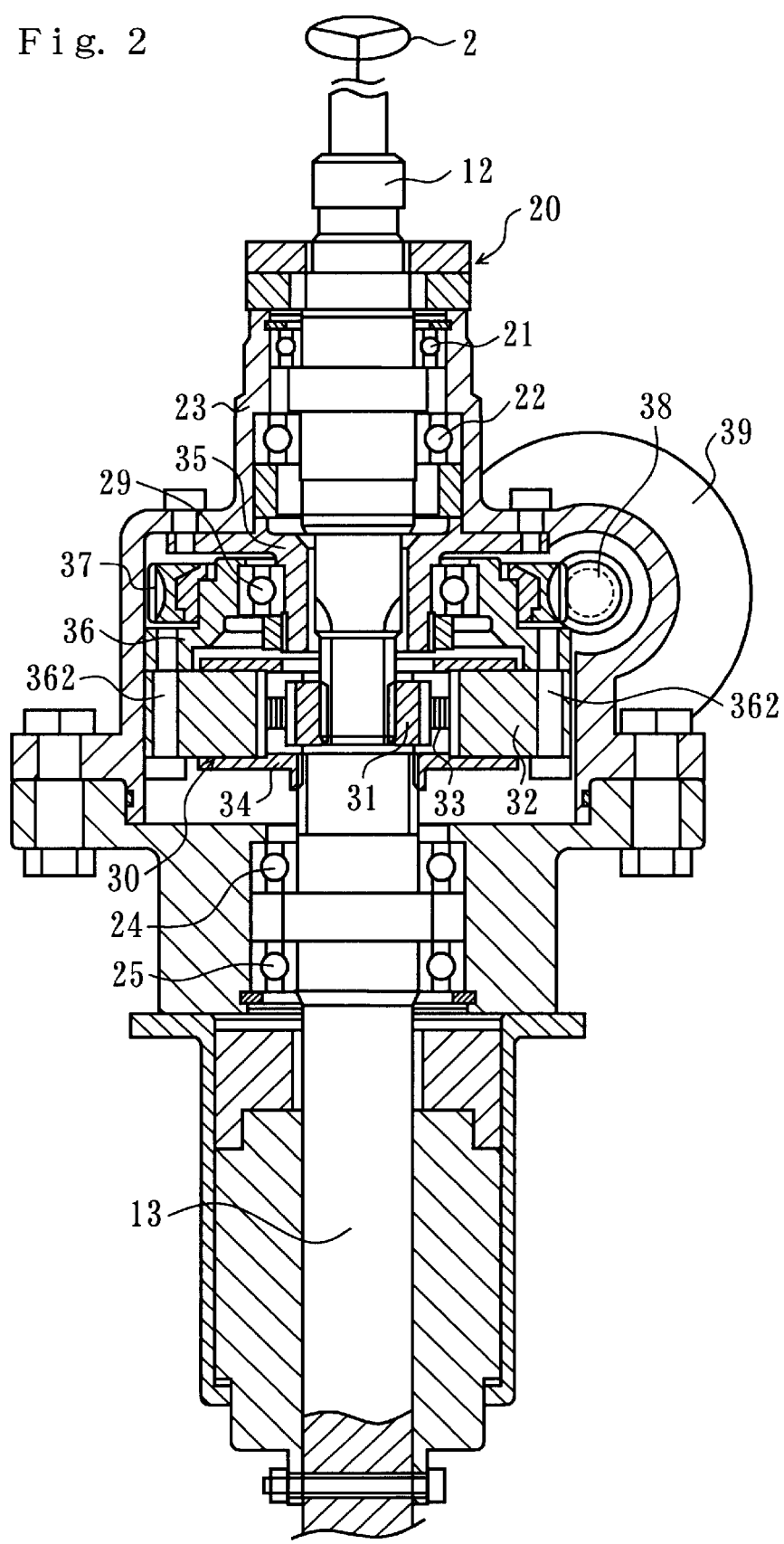
FIG. 2 is a sectional view of the transmission mechanism of the vehicle steering apparatus in the embodiment of the present invention.

The operating side rotating member 12 and vehicle wheel side rotating member 13 are connected to each other by a transmission mechanism 20 so that the transmission of rotation between the respective members is possible. The transmission mechanism 20 is capable of varying the ratio of the rotational transmission between the operating side rotating member 12 and vehicle wheel side rotating member 13. Specifically, as is shown in FIG. 2, the transmission mechanism 20 has a housing 23, and a planetary gear mechanism 30 which is covered by this housing 23. The housing 23 supports the operating side rotating member 12 via bearings 21 and 22, and supports the vehicle wheel side rotating member 13 via bearings 24 and 25. The vehicle wheel side rotating member 13 and operating side rotating member 12 are disposed coaxially with a gap interposed. The transmission of rotation between the operating side rotating member 12 and vehicle wheel side rotating member 13 is accomplished via the planetary gear mechanism 30.

The planetary gear mechanism 30 has a sun gear 31, a ring gear 32 and a carrier 34 as three elements that are capable of relative rotation. A planetary gear 33 that engages with the sun gear 31 and ring gear 32 is held by the carrier 34. The sun gear 31 is mechanically connected to the end portion of the operating side rotating member 12 so that this sun gear 31 rotates together with the operating side rotating member 12. The carrier 34 is connected to the vehicle wheel side rotating member 13 so that the carrier 34 rotates together with the vehicle wheel side rotating member 13. The ring gear 32 is fastened via bolts 362 to a holder 36 that surrounds the operating side rotating member 12. This holder 36 is supported via a bearing 29 by a tubular member 35 that is fastened to the housing 23 so as to surround the operating side rotating member 12. A worm wheel 37 is fastened to the outer circumference of the holder 36 so that the worm wheel 37 rotates together with the holder 36. A worm 38 that engages with the worm wheel 37 is supported by the housing 23. The worm 38 is driven by a adjustment actuator 39 attached to the housing 23, so that the ring gear 32, which is an element of the planetary gear mechanism 30, is driven by the adjustment actuator 39. A known electric motor such as a brushless motor or hydraulic motor can be adopted as the adjustment actuator 39. The ratio of the rotational transmission between the operating side rotating member 12 and vehicle wheel side rotating member 13 can be varied by varying the rotational speed of the ring gear 32 by means of the adjustment actuator 39.

A control system for the steering actuator 3 and adjustment actuator 39 is provided. In the present embodiment, as is shown in FIG. 1, an operation amount sensor 41 which determines the rotational angle of the operating side rotating member 12 as the amount $\delta h$ of operation of the operating member 2, a steering angle sensor 42 which determines the rotational angle of the vehicle wheel side rotating member 13 corresponding to the amount of steering of the vehicle wheels 4 as the actual steering angle $\delta$, a speed sensor 43 which detects the vehicle speed V as a variable that expresses the operating state of the vehicle, and a torque sensor 46 which detects the actual operating torque Th of the operating member 2, are connected to a control device 45 comprised of a computer.

Figure 3:
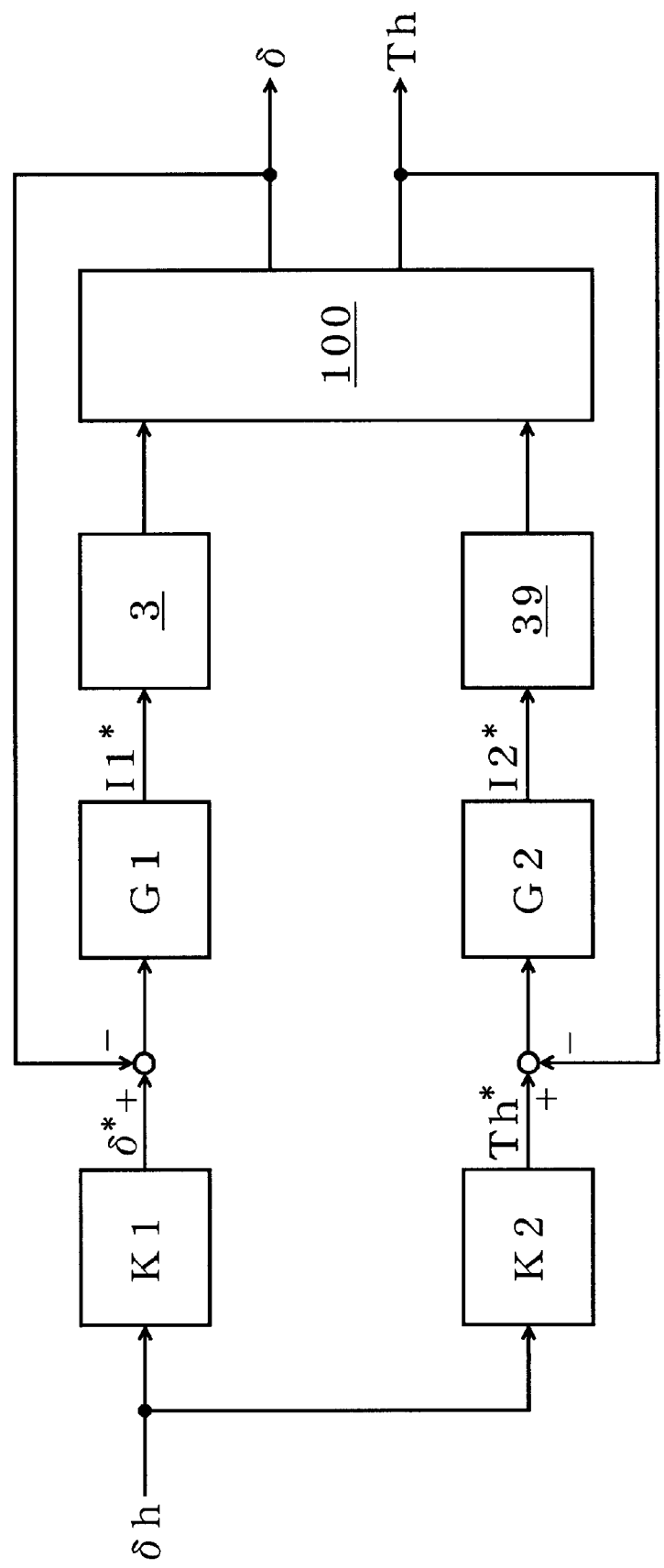
FIG. 3 is a block diagram which shows the control structure of the vehicle steering apparatus in the embodiment of the present invention.
Figure 4A:
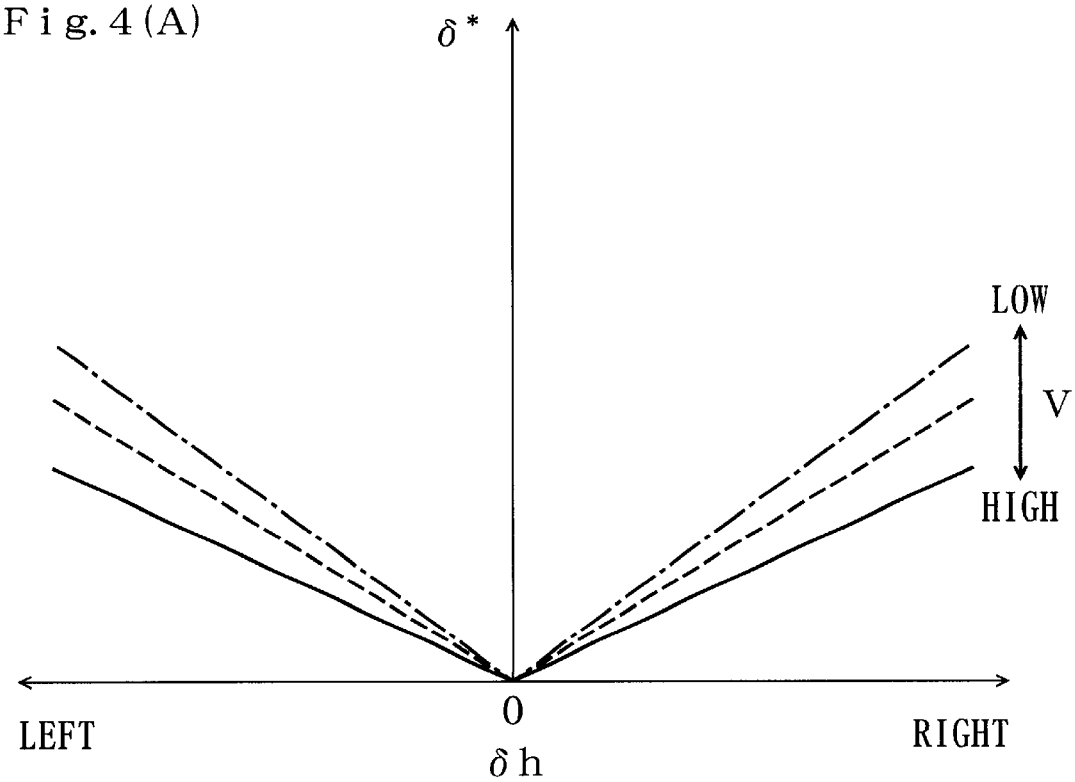
FIG. 4(A) is a graph which shows the relationship between the amount of operation of the operating member and the target steering angle of the vehicle steering apparatus.

The steering angle can be varied in accordance with the operation of the operating member 2 by controlling the steering actuator 3 by means of the control system via a driving circuit 47. For example, as shown in FIG. 3, with the gain of the target steering angle $\delta^*$ relative to the amount of operation $\delta h$ being designated as K1, the control device 45 stores the relationship $\delta^* = K1 \times \delta h$ in memory as a preset relationship between the amount of operation δh and the target steering angle δ*, and calculates the target steering angle δ* of the vehicle 100 from the detected amount of operation δh and the stored relationship. This gain K1 can be set as a function of the vehicle speed so that the gain K1 increases as the speed decreases; accordingly, as shown in FIG. 4(A), the target steering angle δ* is proportional to the amount of operation δh, and the proportionality constant increases as the speed decreases. The steering actuator 3 is controlled so that the deviation between the target steering angle δ* and the detected actual steering angle δ decreases. For example, the control device 45 stores in memory a transfer function G1 of the target driving current I1* of the steering actuator relative to the deviation between the target steering angle δ* and the actual steering angle δ, calculates I1* from the deviation (δ*−δ) determined and the relationship I1*=G1×(δ*−δ), and drives the steering actuator 3. For example, in cases where PI control is performed, the transfer function G1 is determined as G1=Ka[1+1/(τa×s)], where Ka is the gain, τa is a time constant, and s is a Laplace operator, and the gain Ka and time constant τa are adjusted so that optimal control can be performed.

Figure 4B:
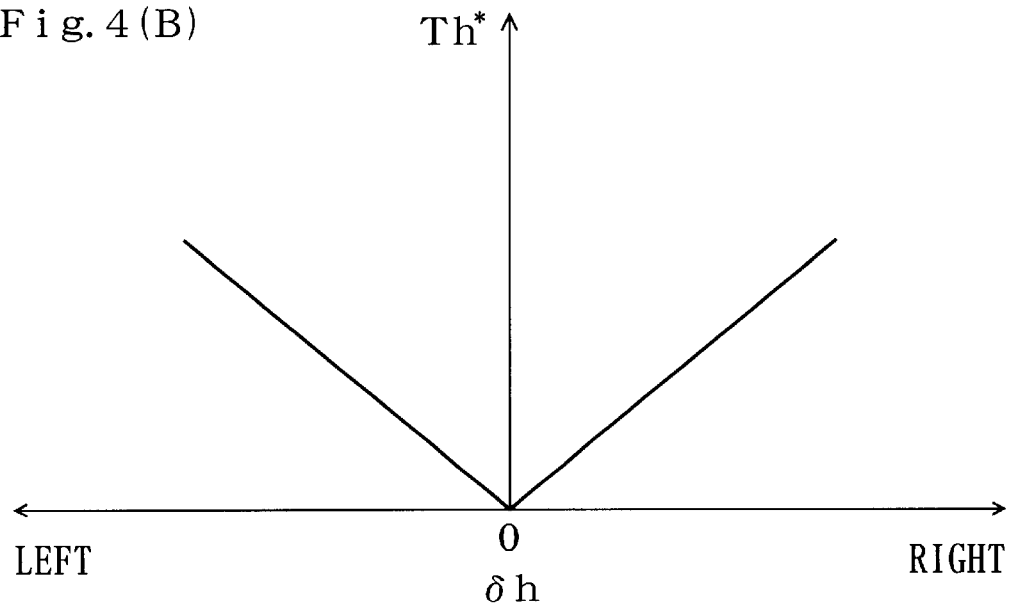
FIG. 4(B) is a graph which shows the relationship between the amount of operation of the operating member and the target operating torque in the embodiment of the present invention.

The ratio of the rotational transmission by the transmission mechanism 20 can be varied by controlling the adjustment actuator 39 by means of the control system via the control circuit 48. Specifically, the ratio of the rotation transmission between the operating side rotating member 12 and vehicle wheel side rotating member 13 is determined in accordance with the rotational speed of the adjustment actuator 39 that drives the ring gear 32. Accordingly, in cases where the ratio of the rotational transmission between the operating side rotating member 12 which is caused to rotate as a result of the operation of the operating member 2 by the driver and the vehicle wheel side rotating member 13 which is caused to rotate by the variation in the steering angle δ is equal to the ratio of the rotational transmission that is determined in accordance with the rotational speed of the adjustment actuator 39, no torque acts other than the torque that is caused to act on the operating member 2 by the driver. Meanwhile, the torque that acts on the operating member varies in accordance with the variation in the rotational speed of the adjustment actuator 39. For example, with the gain of the target operating torque Th* relative to the amount of operation δh being designated as K2, the control device 45 stores in memory the relationship Th*=K2×δh as a preset relationship between the amount of operation δh and the target operating torque Th*, and calculates the target operating torque Th* from the detected amount of operation δh and the stored relationship. As a result, the target operating torque Th* is proportional to the amount of operation δh, as shown in FIG. 4(B). The adjustment actuator 39 is controlled so that the deviation between the target operating torque Th* and the actual operating torque Th is reduced. Specifically, the adjustment actuator 39 is controlled so that a torque that makes the operating member 1 return to the neutral position generates. For example, the control device 45 stores in memory a transfer function G2 of the target driving current I2* of the adjustment actuator 39 relative to the deviation between the target operating torque Th* and the actual operating torque Th, calculates I2* from the deviation (Th*−Th) determined and the relationship I2*=G2×(Th*−Th), and drives the adjustment actuator 39. For example, in cases where PI control is performed, the transfer function G2 is determined as G2=Kb[1+1/((τb×s)], where Kb is the gain, τb is a time constant, and s is a Laplace operator, and the gain Kb and time constant τb are adjusted so that optimal control can be performed. As a result, when the vehicle wheel side rotating member 13 is caused to rotate by the variation of the steering angle δ, and this rotation is transmitted to the operating side rotating member 12 via the transmission mechanism by the control of the steering actuator 3, the actual operating torque Th can be caused to track the target operating torque Th* by varying the ratio of the rotational transmission between the operating side rotating member 12 and vehicle wheel side rotating member 13 by the control of the adjustment actuator 39, so that the movement of the vehicle wheels 4 and the movement of the operating member 1 can be prevented from interfering with each other. The actual operating torque Th is not necessarily limited to a torque that makes the operating member 1 return to the neutral position; the target operating torque Th* can be set so as to act in an arbitrary direction in accordance with the operating conditions.

Abnormality detection means for detecting an abnormality in the adjustment actuator 39 is provided. For example, the control device 45 monitors the deviation between the command value sent to the adjustment actuator 39 from the control device 45 and the output value of the adjustment actuator 39 determined from the value detected by the rotational angle sensor 44, and judges that the adjustment actuator 39 is acting abnormally if the deviation is equal to or greater than a set value.

Figure 5A:
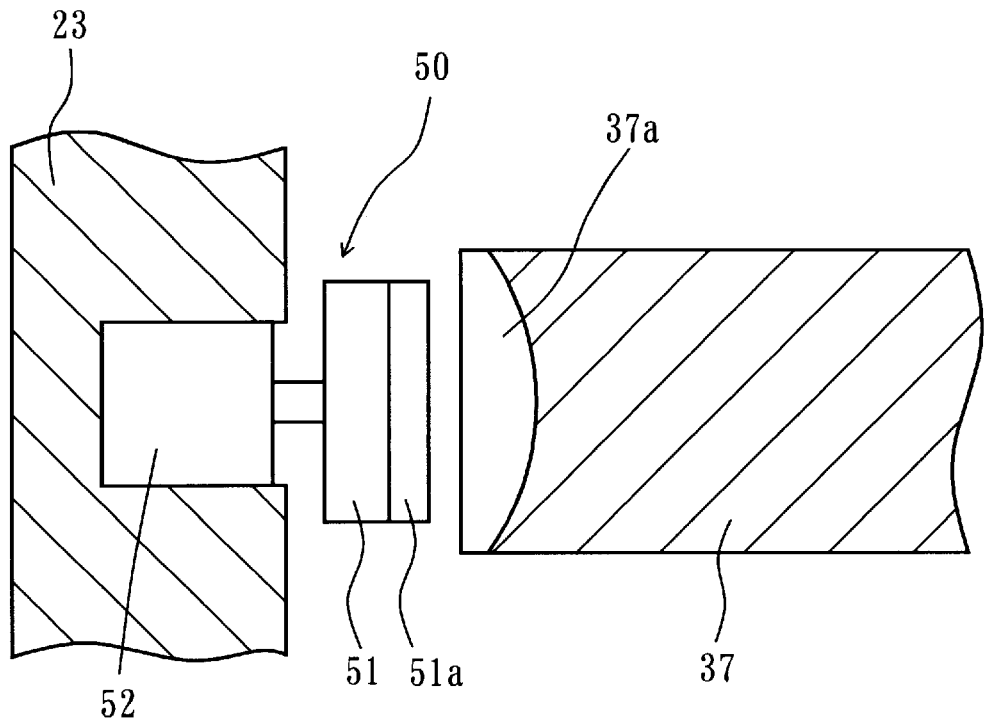
FIG. 5(A) is a structural explanatory diagram of the restraining mechanism of the vehicle steering apparatus.

A restraining mechanism 50 that is capable of restraining the variation in the ratio of the rotational transmission between the operating side rotating member 12 and vehicle wheel side rotating member 13 is provided. There are no particular restrictions on this restraining mechanism 50, as long as the restraining mechanism 50 is capable of restraining the variation in the ratio of the rotational transmission between the rotating members 12 and 13. In the present embodiment, as shown in FIG. 5(A), the restraining mechanism 50 has a pressing member 51 which is attached to the housing 23 via a driving device 52. This pressing member 51 faces the outer circumference of the worm wheel 37. The driving device 52 has a solenoid which generates a force acting on the pressing member 51 so that the pressing member 51 moves away from the worm wheel 37, and a spring which presses the pressing member 51 against the outer circumference of the worm wheel 37 when the current to the solenoid is stopped by an abnormality detection signal from the control device 45. Teeth 51a that engage with the teeth 37a of the worm wheel 37 are formed on the pressing member 51. The rotation of the ring gear 32 integrated with the worm wheel 37 is locked by the engagement of the pressing member 51 with the worm wheel 37. Accordingly, the ratio of the rotational transmission between the operating side rotating member 12 and vehicle wheel side rotating member 13 becomes the ratio of the speed reduction in the planetary gear mechanism, which functions as a rotational transmission mechanism with a fixed ratio of the speed reduction so that the variation of the ratio is restrained.

Figure 5B:
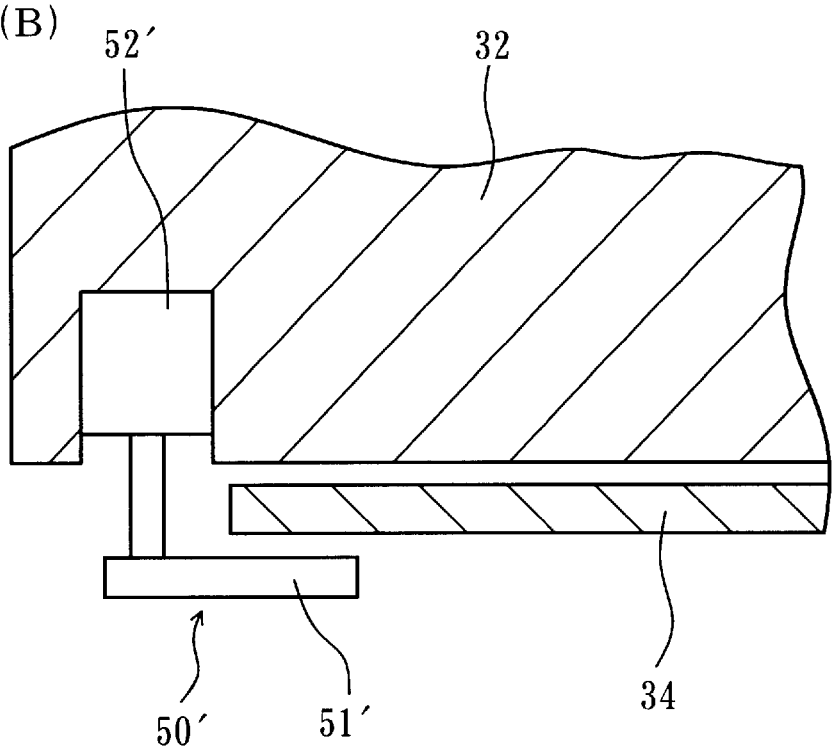
FIG. 5(B) is a structural explanatory diagram of a modification of the restraining mechanism in the embodiment of the present invention.

As shown in a modification illustrated in FIG. 5(B), a restraining mechanism 50' can also be structured by the mutual connection and disconnection of at least two elements in the abovementioned planetary gear mechanism 30. The restraining mechanism 50' has a pressing member 51' which is attached to the ring gear 32 via a driving device 52' so that this pressing member 51' rotates together with the ring gear 32. The pressing member 51' faces the end surface of the carrier 34. The carrier 34 is connected to the vehicle wheel side rotating member 13 via splines or the like so that the carrier 34 can rotate together with the vehicle wheel side rotating member 13 and can move relatively in the axial direction. For example, the driving device 52' is structured from a solenoid which generates a force acting on the pressing member 51' so that the pressing member 51' moves away from the carrier 34, and a spring which presses the pressing member 51' against the carrier 34 when the current to the solenoid is stopped in accordance with an abnormality detection signal from the control device 45. As a result of the pressing of the carrier 34 by the pressing member 51', the carrier 34 is clamped by the pressing member 51' and the ring gear 32, thus the carrier 34 and ring gear 32 are connected to each other so as to rotate together. When the carrier 34 and ring gear 32 rotate together, the ratio of the rotational transmission between the operating side rotating member 12 and vehicle wheel side rotating member 13 is 1:1, so that the variation is restrained.

When the variation in the ratio of the rotational transmission between the operating side rotating member 12 and vehicle wheel side rotating member 13 is restrained, the ratio need not be absolutely constant; few variation can occur. For example, since the transmission of rotation from the worm wheel 37 to the worm 38 is restrained by the gear characteristics themselves of the worm and worm wheel, the restraining mechanism 50 can also be structured from the worm wheel 37 and worm 38 alone with cutting off the current to the adjustment actuator 39 in accordance with an abnormality detection signal.

Figure 6:
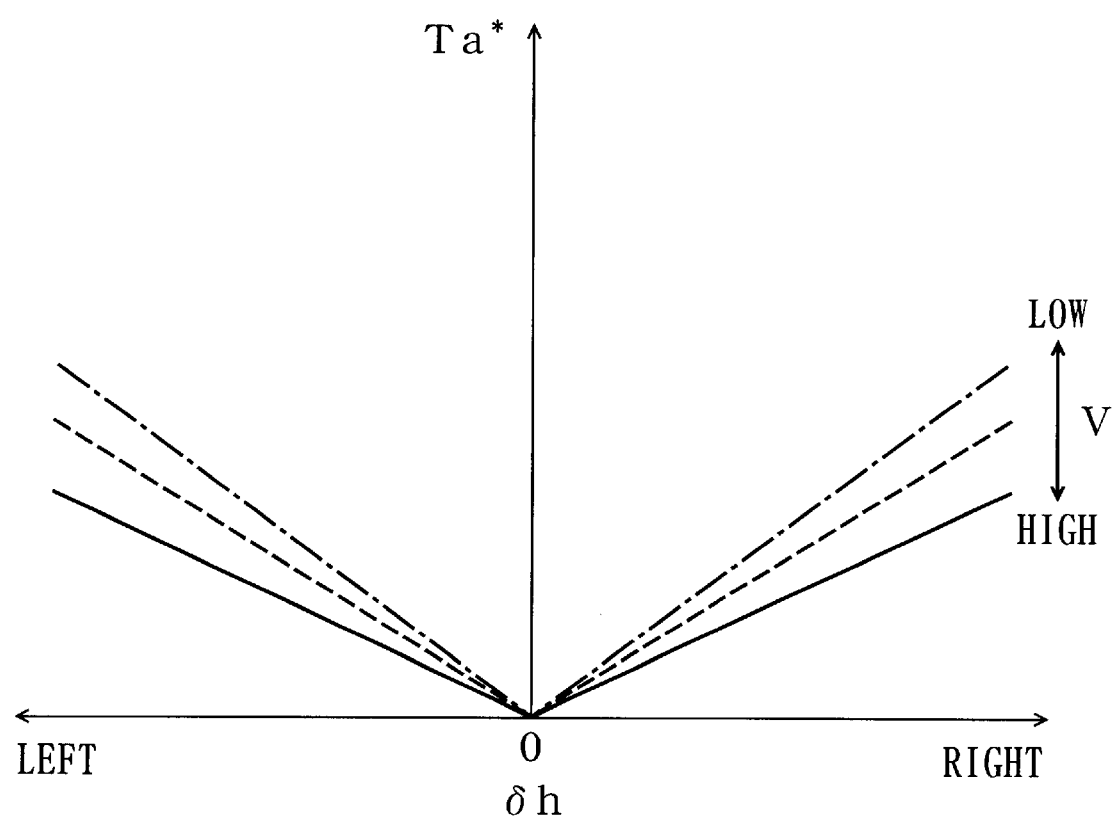
FIG. 6 is a graph which shows the relationship of the target steering torque, the amount of operation of the operating member and the speed of the vehicle of the vehicle steering apparatus in the embodiment of the present invention.

When an abnormality is detected in the adjustment actuator 39, the control device 45 restrains the variation in the ratio of the rotational transmission between the rotating members 12 and 13 by means of the restraining mechanism 50, stops the driving of the adjustment actuator 39 by cutting off the current, and controls the steering actuator 3 so that a steering assist torque can be caused to act. For example, as shown in FIG. 6, the magnitude of the target steering torque Ta* increases with an increase in the amount of operation δh by the action of the steering assist torque, and that decreases with an increase in the vehicle speed V. This relationship is stored in the control device 45. The target steering torque Ta* is calculated from this stored relationship, the amount of operation δh detected by the operation amount sensor 41, and the vehicle speed V detected by the speed sensor 43, and the control device 45 controls the steering actuator 3 so that the deviation between this calculated target steering torque Ta* and the actual operating torque Th detected by the torque sensor 46 is reduced.

Abnormality detection means for detecting an abnormality in the steering actuator 3 are provided. For example, the control device 45 monitors the deviation between the command value sent to the steering actuator 3 from the control device 45 and the output value of the steering actuator 3 determined from the value detected by the steering angle sensor 42, and judges that the steering actuator 3 is acting abnormally if this deviation is equal to or greater than a set value.

When an abnormality is detected in the steering actuator 3, the control device 45 restrains the variation in the ratio of the rotational transmission between the rotating members 12 and 13 by means of the restraining mechanism 50, stops the driving of the steering actuator 3 by cutting off the current, and controls the adjustment actuator 39 so that a steering assist torque can be caused to act. For example, as shown in FIG. 6, the magnitude of the target steering torque Ta* is increased with an increase in the amount of operation δh, and is decreased with an increase in the vehicle speed V for the action of the steering assist torque. This relationship is stored in the control device 45. The target steering torque Ta* is calculated from this stored relationship, the amount of operation δh detected by the operation amount sensor 41, and the vehicle speed V detected by the speed sensor 43, and the control device 45 controls the adjustment actuator so that the deviation between the calculated target steering torque Ta* and the actual operating torque Th detected by the torque sensor 46 is reduced.

Furthermore, when an abnormality is detected in both the adjustment actuator 39 and steering actuator 3, the control device 45 restrains the variation in the ratio of the rotational transmission between the rotating members 12 and 13 by means of the restraining mechanism 50, and stops the driving of the steering actuator 3 and adjustment actuator 39 by cutting off the current. As a result, the steering apparatus functions as an ordinary manual type steering apparatus.

Abnormality detection means for the abovementioned control system are provided. In the present embodiment, a second control device 56 and a third control device 57 are connected to the control device 45. The respective control devices 45, 56 and 57 perform the same calculations independently of each other, and the results of these calculations are compared. If only the results of the calculations performed by the control device 45 are different, the second control device 56 outputs an abnormality detection signal. As a result of this abnormality detection signal, the driving of the steering actuator 3 and adjustment actuator 39 is stopped by cutting off the current, and the restraining mechanism 50 restrains the variation in the ratio of the rotational transmission between the rotating members 12 and 13. As a result, the steering apparatus functions as an ordinary manual type steering apparatus when an abnormality is detected in the control system.

Figure 8:
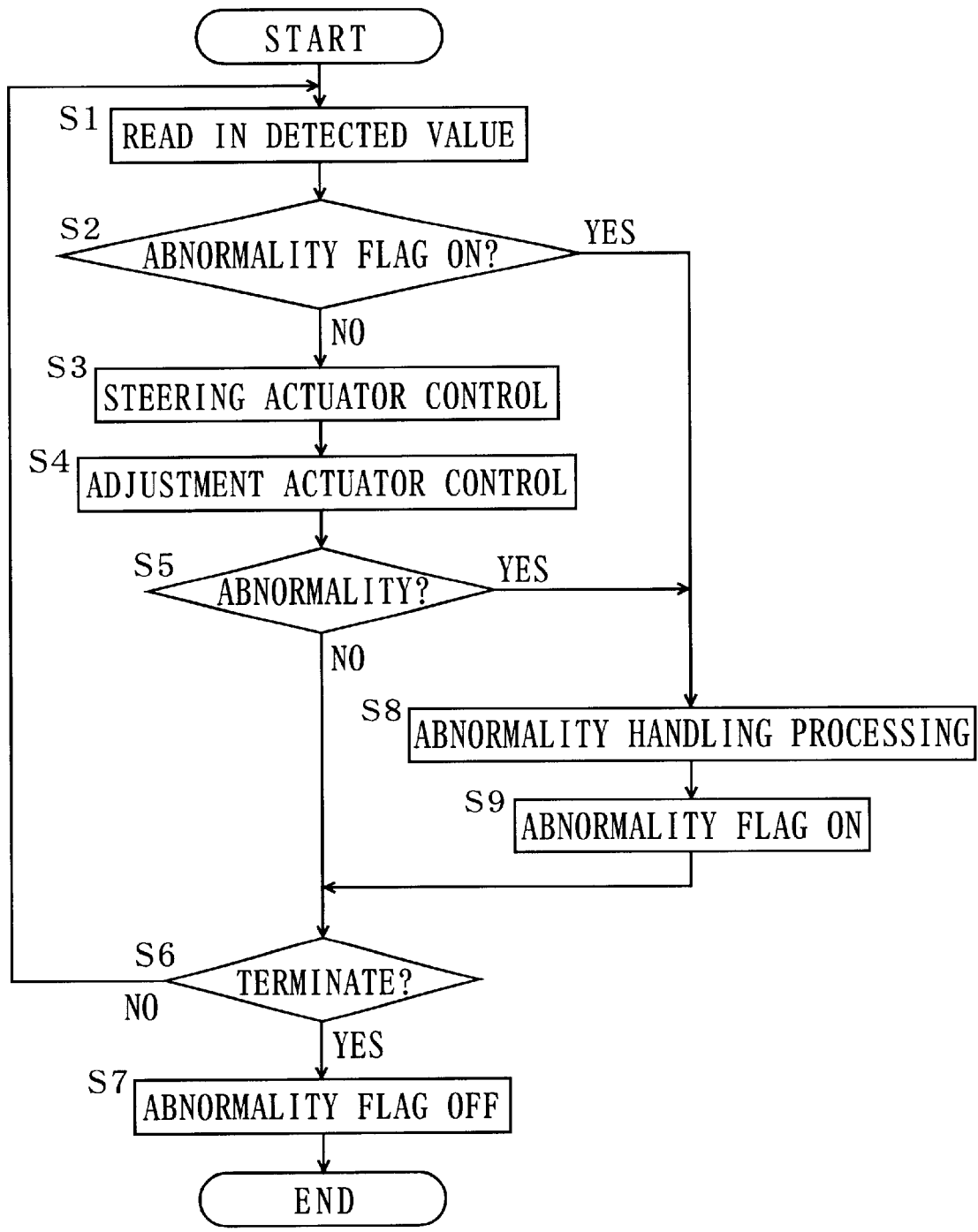
FIG. 8 is a flow chart which shows the control procedure of the control device of the vehicle steering apparatus in the embodiment of the present invention.

The control procedures performed by the control devices 45, 56 and 57 are described with reference to the flow chart shown in FIG. 8.

First, the values detected by the respective sensors are read in (step S1). Next, a judgement is made as to whether the abnormality flag is on or not (step S2). If the abnormality flag is not on, the steering actuator 3 is controlled so that the deviation between the target steering angle δ* and actual steering angle δ determined as described above is reduced (step S3). Furthermore, the adjustment actuator 39 is controlled so that the deviation between the target operating torque Th* and actual operating torque Th determined as described above is reduced (step S4). Afterward, the presence or absence of an abnormality detection signal is judged (step S5), and if there is no abnormality detection signal, a judgement is made as to whether or not to terminate the control, e.g., according to whether or not the ignition switch of the vehicle is on (step S6). In cases where the control is to be terminated, the abnormality flag is switched off (step S7), and the control is then terminated. In cases where the control is not to be terminated, the processing returns to step S1. In cases where the abnormality flag is on in step S2, abnormality handling processing is performed (step S8) if an abnormality detection signal is output in step S5. Specifically, in cases where an abnormality is detected in the adjustment actuator 39, the variation in the ratio of the rotational transmission between the two rotating members 12 and 13 is restrained by the restraining mechanism 50, the driving of the adjustment actuator 39 is stopped by cutting off the current, and the steering actuator 3 is controlled so that a steering assist torque is caused to act. In cases where an abnormality is detected in the steering actuator 3, the variation in the ratio of the rotational transmission between the two rotating members 12 and 13 is restrained by the restraining mechanism 50, the driving of the steering actuator 3 is stopped by cutting off the current, and the adjustment actuator 39 is controlled so that a steering assist torque is caused to act. In cases where an abnormality is detected in both the adjustment actuator 39 and steering actuator 3, the variation in the ratio of the rotational transmission between the operating side rotating member 12 and vehicle wheel side rotating member 13 is restrained by the restraining mechanism 50 as described above, and the driving of the steering actuator 3 and adjustment actuator 39 is stopped by cutting off the current. Afterward, the abnormality flag is switched on (step S9), and a judgement is made in step S6 as to whether or not to terminate the control.

In the abovementioned embodiment, the operating side rotating member 12 that is mechanically connected to the operating member 1 and the vehicle wheel side rotating member 13 that is mechanically connected to the vehicle wheels 4 can transmit rotation to each other via the transmission mechanism 20. Accordingly, the security of the fail-safe function can be improved. Furthermore, by varying the ratio of the rotational transmission between the vehicle wheel side rotating member 13 and the operating side rotating member 12 by the control of the adjustment actuator 39, it is possible to cause the operating side rotating member 12 to rotate without being affected by the rotation of the vehicle wheel side rotating member 13. As a result, an arbitrary torque can be caused to act on the operating member 1 without being affected by the variation in the steering angle, so that smooth steering can be accomplished without an mutual interference between the movement of the vehicle wheels and the movement of the operating member 1. Furthermore, in cases where an abnormality is detected in the adjustment actuator 39 or steering actuator 3, the steering apparatus can function as a power steering apparatus. Moreover, even if an abnormality occurs in both the adjustment actuator 39 and steering actuator 3, or in the control system, the steering apparatus can function as a manual type steering apparatus. Furthermore, the structure can be simplified by structuring the transmission mechanism 20 from the planetary gear mechanism 30 and the adjustment actuator 39 which drives one of the elements of the planetary gear mechanism 30.

As a first modification, in cases where an abnormality is detected in the adjustment actuator 39, instead of controlling the steering actuator 3 so that a steering assist torque is caused to act, it would also be possible to use a system in which the worm 38 and worm wheel 37 are arranged so that rotation cannot be transmitted from the worm wheel to the worm, and to stop the driving of the steering actuator 3 by cutting off the current. If the remainder of the apparatus is structured in the same manner as in the abovementioned embodiment, the steering apparatus can function as an ordinary manual type steering apparatus by restraining the variation in the ratio of the rotational transmission between the operating side rotating member 12 and vehicle wheel side rotating member 13 in cases where an abnormality is detected in the adjustment actuator 39.

As a second modification, instead of restraining the variation in the ratio of the rotational transmission between the two rotating members 12 and 13 by means of the restraining mechanism 50 in cases where an abnormality is detected in the adjustment actuator 39, it would be possible to stop the transmission of rotation between the operating side rotating member 12 and vehicle wheel side rotating member 13 by interposing a clutch or the like between the two rotating members 12 and 13 in which the clutch is disengaged when an abnormality is detected. Furthermore, instead of controlling the steering actuator 3 so that a steering assist torque is caused to act, it would be possible to control the steering actuator 3 in the same manner as in normal operation. If the remainder of the apparatus is structured in the same manner as in the abovementioned embodiment, the steering angle can be varied by controlling the steering actuator 3 in accordance with the operation of the operating member 2 in cases where an abnormality is detected in the adjustment actuator 39; furthermore, there is no interference with the operation of the operating member 2.

As a third modification, it would also be possible that a change-over switch 55a for the abnormality handling modes that is used in cases where an abnormality is detected in the adjustment actuator 39 is connected to the control device 45, and that the switching of this switch 55a enables selection of one of three modes, i.e., a mode in which a steering assist torque is caused to act as in the abovementioned embodiment, a mode in which the steering apparatus is caused to function as a manual type steering apparatus as in the first modification, and a mode in which the steering actuator 3 is controlled in accordance with the operation of the operating member 2 as in the second modification, as the abnormality handling mode in cases where an abnormality is detected in the adjustment actuator 39. This mode change-over switch 55a can be structured so that the switch can be switched by the operator in the passenger compartment of the vehicle, or can be set in one of the modes at the time of manufacture of the vehicle and structured so that the switch cannot be operated from the passenger compartment of the vehicle.

As a fourth modification, in cases where an abnormality is detected in the steering actuator 3, instead of controlling the adjustment actuator 39 so that a steering assist torque is caused to act, it would also be possible that the worm 38 and worm wheel 37 are adopted so that rotation cannot be transmitted from the worm wheel 37 to the worm 38, and that the driving of the adjustment actuator 39 is stopped by cutting off the current. If the remainder of the apparatus is structured in the same manner as in the abovementioned embodiment, the steering apparatus can function as an ordinary manual type steering apparatus by restraining the variation in the ratio of the rotational transmission between the operating side rotating member 12 and vehicle wheel side rotating member 13 in cases where an abnormality is detected in the steering actuator 3.

Figure 7:
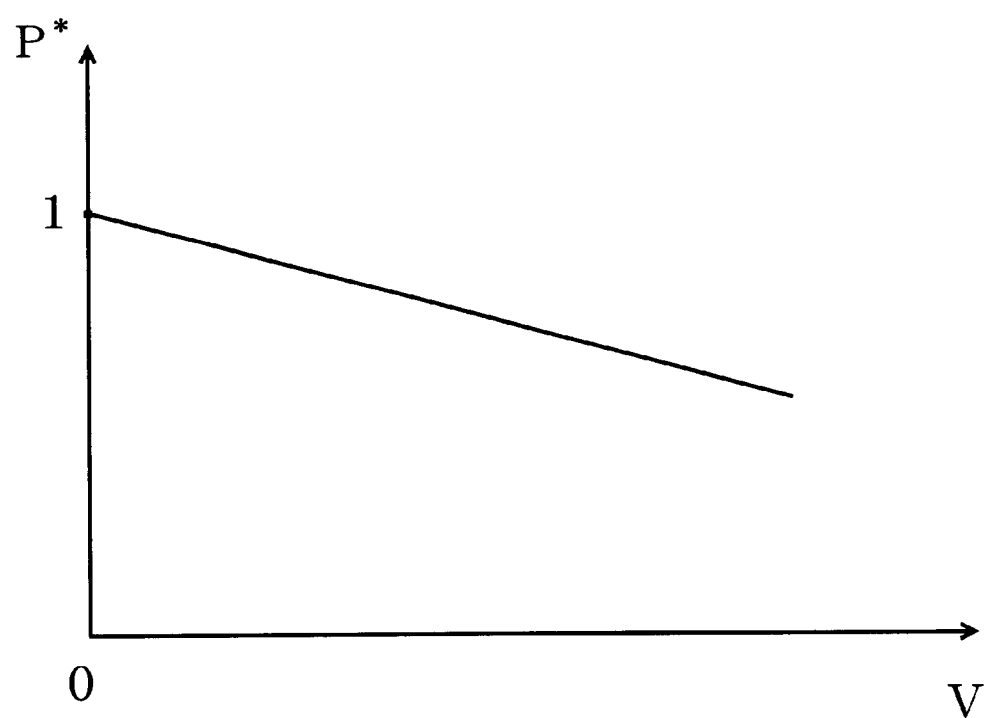
FIG. 7 is a graph which shows the relationship of the speed of the vehicle and the target value of the ratio of the rotational transmission between the rotating members of the vehicle steering apparatus in a fifth modification of the present invention.

As a fifth modification, in cases where an abnormality is detected in the steering actuator 3, instead of controlling the adjustment actuator 39 so that a steering assist torque is caused to act, it would also be possible to detect a variable that expresses the operating state of the vehicle, and to control the adjustment actuator 39 so that the ratio of the rotational transmission between the operating side rotating member 12 and vehicle wheel side rotating member 13 varies in accordance with this detected variable. If the remainder of the apparatus is structured in the same manner as in the abovementioned embodiment, steering characteristics that correspond to the operating state of the vehicle can be obtained in cases where an abnormality is detected in the steering actuator 39. For example, the vehicle speed V is detected as a variable that expresses the operating state of the vehicle, and the relationship between the vehicle speed V and the target value P* of the ratio of the rpm between the operating side rotating member 12 and vehicle wheel side rotating member 13 as shown in FIG. 7 is stored in the control device 45. In the relationship between the vehicle speed V and the target value P*, for example, the target value P* is taken as 1 in the base state in which the vehicle speed is zero, and is reduced as the speed increases. The control device 45 calculates the target value P* from the stored relationship and the detected vehicle speed V, determines the target rotational speed of the vehicle wheel side rotating member 13 from the rotational speed of the operating side rotating member 12 that is determined from the target value P* and the value detected by the operation amount sensor 41, and controls the adjustment actuator 39 so that the deviation between the determined target rotational speed of the vehicle wheel side rotating member 13 and the rotational speed of the vehicle wheel side rotating member 13 determined from the value detected by the steering angle sensor 42 is reduced. As a result, the turning characteristics of the vehicle in a low-speed operating state and the stability in a high-speed operating state can be improved.

As a sixth modification, it would also be possible that a change-over switch 55b for the abnormality handling modes that is used in cases where an abnormality is detected in the steering actuator 3 is connected to the control device 45, and that the switching of this switch 55b enables selection of one of three modes, i.e., a mode in which a steering assist torque is caused to act as in the abovementioned embodiment, a mode in which the steering apparatus is caused to function as a manual type steering apparatus as in the fourth modification, and a mode in which the ratio of the rotational transmission between the operating side rotating member 12 and vehicle wheel side rotating member 13 is varied in accordance with a variable that expresses the operating state of the vehicle as in the fifth modification, as the abnormality handling mode in cases where an abnormality is detected in the steering actuator 3. The mode change-over switch 55b can be structured so that the switch can be switched by the operator in the passenger compartment of the vehicle, or can be set in one of the modes at the time of manufacture of the vehicle and structured so that the switch cannot be switched from the passenger compartment of the vehicle.

As a seventh modification, it would also be possible to control the adjustment actuator 39 so that the rotational force that acts on the operating side rotating member 12 is zero by setting the target operating torque Th* at zero in the abovementioned embodiment. As a result, the operating torque that acts on the operating member 1 when the steering angle varies can be reduced to zero.

As an eighth modification, it would also be possible to stop the transmission of rotation between the operating side rotating member 12 and vehicle wheel side rotating member 13 by the transmission mechanism 20 in a state in which the mechanical connection between the operating side rotating member 12 and vehicle wheel side rotating member 13 by the transmission mechanism 20 is maintained. For example, an electromagnetic clutch which is capable of disconnecting and connecting the transmission of rotation is provided between the ring gear 32 and a holder 36 with which the worm wheel 37 is integrated in the abovementioned embodiment, and the ring gear 32 is allowed to rotate freely by disengaging this clutch, so that the transmission of rotation by the transmission mechanism 20 is stopped in a state in which the mechanical connection between the operating side rotating member 12 and vehicle wheel side rotating member 13 is maintained. As a result, the operating torque can be reduced to approximately zero when the steering angle varies without any need for the adjustment actuator 39 and control system. The connecting and disconnecting via the clutch can be accomplished by the operation of a switch connected to the control device 45 by the driver, or the clutch can be disengaged based on an abnormality detection signal of the adjustment actuator 39.

The present invention is not limited to the abovementioned embodiment and modifications.

For example, it would also be possible to connect the sun gear 31 to the operating side rotating member 12, to connect the ring gear 32 to the vehicle wheel side rotating member 13, and to drive the carrier 34 by means of the adjustment actuator 39. Alternatively, it would also be possible to connect the ring gear 32 or carrier 34 to the operating side rotating member 12, to make the element of the planetary gear mechanism 30 that is connected to the vehicle wheel side rotating member 13 either the sun gear 31 or ring gear 32 that is not connected to the operating side rotating member 12, and to make the element of the planetary gear mechanism 30 that is driven by the adjustment actuator 39 either the sun gear 31 or carrier 34 that is not connected to either of the rotating members 12 or 13. Specifically, any of the respective planetary gear elements, i.e., the sun gear 31, ring gear 32 or carrier 34, can be connected to the operating side rotating member 12, either of the remaining planetary gear elements that are not connected to the operating side rotating member 12 can be connected to the vehicle wheel side rotating member 13, and the planetary gear element that is not connected to either of the rotating members 12 or 13 can be rotationally driven by the adjustment actuator 39. Furthermore, a rotational transmission mechanism other than a planetary gear mechanism 30, such as a planetary cone type rotational transmission mechanism, planetary roller type rotational transmission mechanism, differential gear mechanism, wave-motion gear speed reduction mechanism, ball speed reduction mechanism or the like, in which three elements rotate to each other and the ratio of the rotational transmission between the two elements can be varied in accordance with variation in the rotational speed of the remaining elements, can be used, with one of the three elements being connected to the operating side rotating member 12, either of the remaining two elements that are not connected to the operating side rotating member 12 being connected to the vehicle wheel side rotating member 13, and the remaining element being driven by the adjustment actuator 39.

Furthermore, a variable other than the vehicle speed, such as the amount of operation of the operating member 2, can be used instead of the vehicle speed or together with the vehicle speed as a variable that expressed the operating state of the vehicle, and the adjustment actuator 39 can be controlled so that the ratio of the rotational transmission between the rotating members is varied in accordance with this variable when an abnormality is detected in the steering actuator. In cases where the amount of operation is large, the turning characteristics of the vehicle can be improved by setting the ratio of the rpm between the vehicle wheel side rotating member 13 and the operating side rotating member 12 at a larger value than in cases where the amount of operation is small.

Furthermore, there are no particular limitations on the construction of the control system, as long as the effect of the present invention can be obtained.

What is claimed is:

1. A vehicle steering apparatus comprising:
   an operating member;
   a steering actuator;
   a steering gear which transmits the movement of the steering actuator to the vehicle wheels so that a variation in the steering angle is generated;
   a control system which is capable of controlling the steering actuator so that the steering angle varies in accordance with the operation of the operating member;
   an operating side rotating member which is mechanically connected to the operating member so as to rotate in accordance with the operation of the operating member;

a vehicle wheel side rotating member which is mechanically connected to the vehicle wheels so as to rotate in accordance with the variation in the steering angle; and a transmission mechanism which mechanically connects the operating side rotating member and the vehicle wheel side rotating member to each other so that the transmission of rotation is possible, and so that a ratio of the rotational transmission can be varied.

2. The vehicle steering apparatus according to claim 1, comprising:

an adjustment actuator which is used to adjust the ratio of the rotational transmission by the transmission mechanism; and a control system which is capable of controlling the adjustment actuator so that the ratio of the rotational transmission by the transmission mechanism can be varied.

3. The vehicle steering apparatus according to claim 2, comprising:

means for determining a amount of operation of the operating member;

means for storing in memory a set relationship between the amount of operation of the operating member and a target steering angle;

means for calculating the target steering angle from the determined amount of operation of the operating member and a stored relationship;

means for determining an actual steering angle;

means for storing in memory a set relationship between the amount of operation of the operating member and a target operating torque;

means for calculating the target operating torque from the determined amount of operation of the operating member and the stored relationship; and means for determining a actual operating torque of the operating member;

wherein said steering actuator is made controllable so that a deviation between the target steering angle and the actual steering angle is reduced, and said adjustment actuator is made controllable so that the deviation between the target operating torque and the actual operating torque is reduced.

4. The vehicle steering apparatus according to claim 2, wherein the adjustment actuator is made controllable so that a torque oriented in an arbitrary direction acts on the operating member.

5. The vehicle steering apparatus according to claim 2, wherein the adjustment actuator is made controllable so that a rotational force acting on the operating side rotating member is reduced to zero.

6. The vehicle steering apparatus according to claim 2, comprising:

abnormality detection means for detecting an abnormality in the adjustment actuator; and a restraining mechanism that is capable of restraining the variation in the ratio of the rotational transmission between the operating side rotating member and the vehicle wheel side rotating member;

wherein the variation in the ratio of the rotational transmission between the operating side rotating member and the vehicle wheel side rotating member is restrained by the restraining mechanism, the driving of the adjustment actuator is stopped, and the steering actuator is controlled so that a steering assist torque is caused to act, in cases where the abnormality is detected in the adjustment actuator.

7. The vehicle steering apparatus according to claim 2, comprising:

abnormality detection means for detecting an abnormality in the adjustment actuator; and a restraining mechanism that is capable of restraining the variation in the ratio of the rotational transmission between the operating side rotating member and the vehicle wheel side rotating member;

wherein the variation in the ratio of the rotational transmission between the operating side rotating member and the vehicle wheel side rotating member is restrained by the restraining mechanism, and the driving of the adjustment actuator and the steering actuator is stopped, in cases where the abnormality is detected in the adjustment actuator.

8. The vehicle steering apparatus according to claim 2, comprising:

abnormality detection means for detecting an abnormality in the adjustment actuator;

wherein the driving of the adjustment actuator is stopped, and the transmission of rotation between the operating side rotating member and the vehicle wheel side rotating member is stopped, in cases where the abnormality is detected in the adjustment actuator.

9. The vehicle steering apparatus according to claim 2, comprising:

abnormality detection means for detecting an abnormality in the adjustment actuator;

a restraining mechanism that is capable of restraining the variation in the ratio of the rotational transmission between the operating side rotating member and the vehicle wheel side rotating member; and a change-over switch for the abnormality handling modes that is used in cases where the abnormality is detected in the adjustment actuator wherein the switching of said switch enables selection of one of three modes, i.e., a mode in which the variation in the ratio of the rotational transmission between the operating side rotating member and the vehicle wheel side rotating member is restrained by the restraining mechanism, the driving of the adjustment actuator is stopped, and the steering actuator is controlled so that a steering assist torque is caused to act, a mode in which the variation in the ratio of the rotational transmission between the operating side rotating member and the vehicle wheel side rotating member is restrained by the restraining mechanism, and the driving of the adjustment actuator and steering actuator is stopped, and a mode in which the driving of the adjustment actuator is stopped, and the transmission of rotation between the operating side rotating member and the vehicle wheel side rotating member is stopped.

10. The vehicle steering apparatus according to claim 2, comprising:

abnormality detection means for detecting an abnormality in the steering actuator; and a restraining mechanism that is capable of restraining the variation in the ratio of the rotational transmission between the operating side rotating member and the vehicle wheel side rotating member;

wherein the variation in the ratio of the rotational transmission between the operating side rotating member and the vehicle wheel side rotating member is restrained by the restraining mechanism, the driving of the steering actuator is stopped, and the adjustment actuator is controlled so that a steering assist torque is caused to act, in cases where the abnormality is detected in the steering actuator.

11. The vehicle steering apparatus according to claim 2, comprising:

abnormality detection means for detecting an abnormality in the steering actuator; and a restraining mechanism that is capable of restraining the variation in the ratio of the rotational transmission between the operating side rotating member and the vehicle wheel side rotating member;

wherein the variation in the ratio of the rotational transmission between the operating side rotating member and the vehicle wheel side rotating member is restrained by the restraining mechanism, and the driving of the adjustment actuator and steering actuator is stopped, in cases where the abnormality is detected in the steering actuator.

12. The vehicle steering apparatus according to claim 2, comprising:

abnormality detection means for detecting an abnormality in the steering actuator; and means for detecting a variable that expresses the operating state of the vehicle;

wherein the driving of the steering actuator is stopped, and the adjustment actuator is controlled so that the ratio of the rotational transmission between the operating side rotating member and the vehicle wheel side rotating member is varied in accordance with the detected variable expressing the operating state of the vehicle, in cases where the abnormality is detected in the steering actuator.

13. The vehicle steering apparatus according to claim 2, comprising:

abnormality detection means for detecting an abnormality in the steering actuator;

a restraining mechanism that is capable of restraining the variation in the ratio of the rotational transmission between the operating side rotating member and the vehicle wheel side rotating member;

means for detecting a variable that expresses the operating state of the vehicle; and a change-over switch for the abnormality handling modes that is used in cases where the abnormality is detected in the steering actuator;

wherein the switching of said switch enables selection of one of three modes, i.e., a mode in which the variation in the ratio of the rotational transmission between the operating side rotating member and the vehicle wheel side rotating member is restrained by the restraining mechanism, the driving of the steering actuator is stopped, and the adjustment actuator is controlled so that a steering assist torque is caused to act, a mode in which the variation in the ratio of the rotational transmission between the operating side rotating member and the vehicle wheel side rotating member is restrained by the restraining mechanism, and the driving of the adjustment actuator and steering actuator is stopped, and a mode in which the driving of the steering actuator is stopped, and the adjustment actuator is controlled so that the ratio of the rotational transmission between the operating side rotating member and the vehicle wheel side rotating member is caused to vary in accordance with the detected variable that expresses the operating state of the vehicle.

14. The vehicle steering apparatus according to claim 2, comprising:

abnormality detection means for detecting an abnormality in the adjustment actuator;

abnormality detection means for detecting an abnormality in the steering actuator; and a restraining mechanism that is capable of restraining the variation in the ratio of the rotational transmission between the operating side rotating member and the vehicle wheel side rotating member;

wherein the variation in the ratio of the rotational transmission between the operating side rotating member and the vehicle wheel side rotating member is restrained by the restraining mechanism, and the driving of the adjustment actuator and steering actuator is stopped, in cases where the abnormality in the adjustment actuator and the abnormality in the steering actuator are detected.

15. The vehicle steering apparatus according to claim 2, comprising:

abnormality detection means for detecting an abnormality in the control system of the steering actuator and the adjustment actuator; and a restraining mechanism that is capable of restraining the variation in the ratio of the rotational transmission between the operating side rotating member and, the vehicle wheel side rotating member;

wherein the variation in the ratio of the rotational transmission between the operating side rotating member and the vehicle wheel side rotating member is restrained by the restraining mechanism, and the driving of the adjustment actuator and the steering actuator is stopped, when the abnormality is detected in the control system.

16. The vehicle steering apparatus according to claim 2, wherein said transmission mechanism has three elements that are capable of relative rotation, the ratio of the rotational transmission between two of the elements can be varied in accordance with the variation in the rotational speed of the third element, one of the three elements is connected to the operating side rotating member, one of the elements that is not connected to the operating side rotating member is connected to the vehicle wheel side rotating member, the remaining element is driven by said adjustment actuator, and said ratio of the rotational transmission is varied by controlling said adjustment actuator by means of said control system.

17. The vehicle steering apparatus according to claim 16, wherein said transmission mechanism has a planetary gear mechanism in which a planetary gear that engages with a sun gear and a ring gear is held by a carrier, and the sun gear, ring gear and carrier are taken as said three elements that are capable of relative rotation.

18. The vehicle steering apparatus according to claim 1, wherein the transmission of rotation between the operating side rotating member and the vehicle wheel side rotating member via the transmission mechanism can be stopped in a state in which a mechanical connection between the operating side rotating member and the vehicle wheel side rotating member is maintained by the transmission mechanism.

* * * * *